Figure 3:
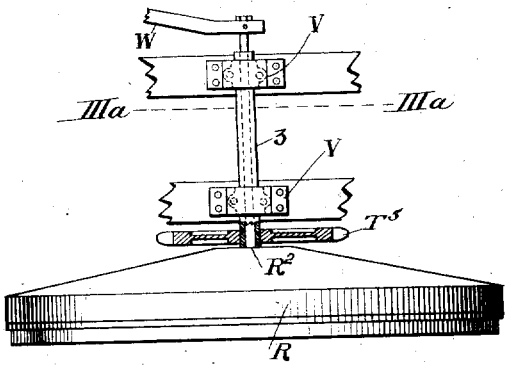
Figure 3A:
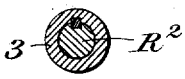

No. 12,604. REISSUED FEB. 12, 1907.
E. BAGNALL.
APPARATUS FOR GRINDING, SMOOTHING, AND POLISHING PLATE GLASS.
APPLICATION FILED MAR. 30, 1905.
4 SHEETS—SHEET 1.
Fig. 1.
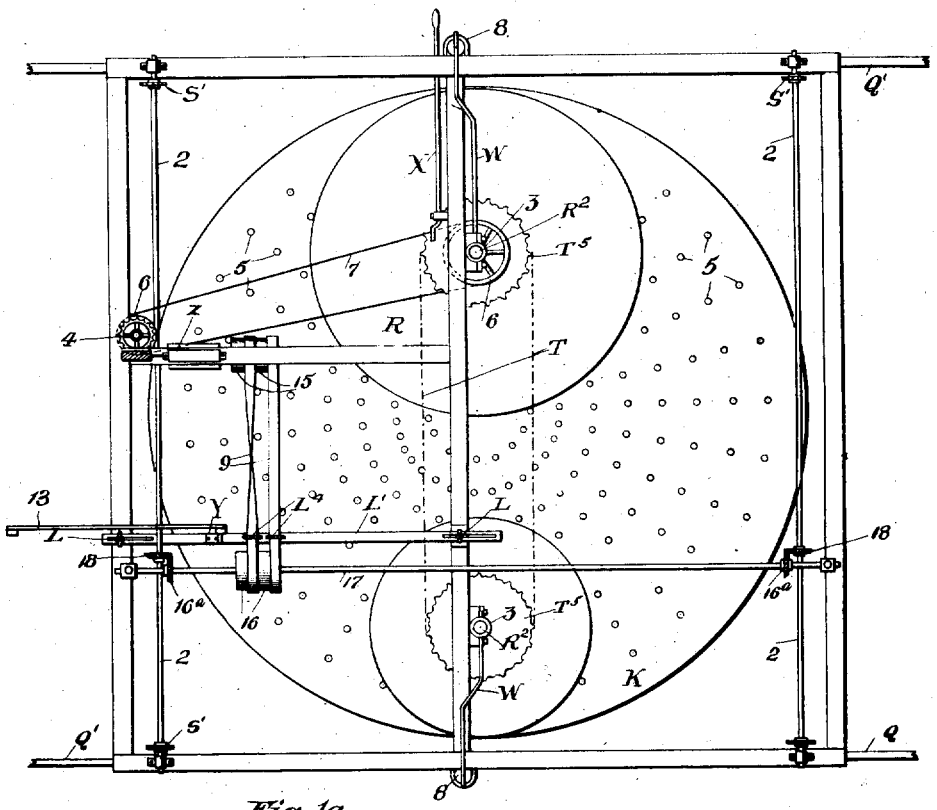
Fig. 1a.
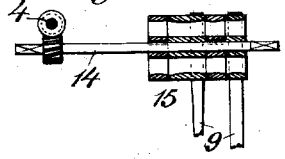
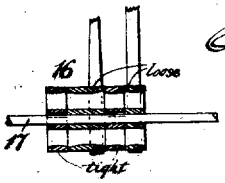
WITNESSES:
E. R. Rodd.
Chas. S. Fipley
Edward Bagnall INVENTOR.
BY O. M. Clarke
his ATTORNEY.

No. 12,604. REISSUED FEB. 12, 1907.
E. BAGNALL.
APPARATUS FOR GRINDING, SMOOTHING, AND POLISHING PLATE GLASS.
APPLICATION FILED MAR. 30, 1905.
4 SHEETS—SHEET 2.
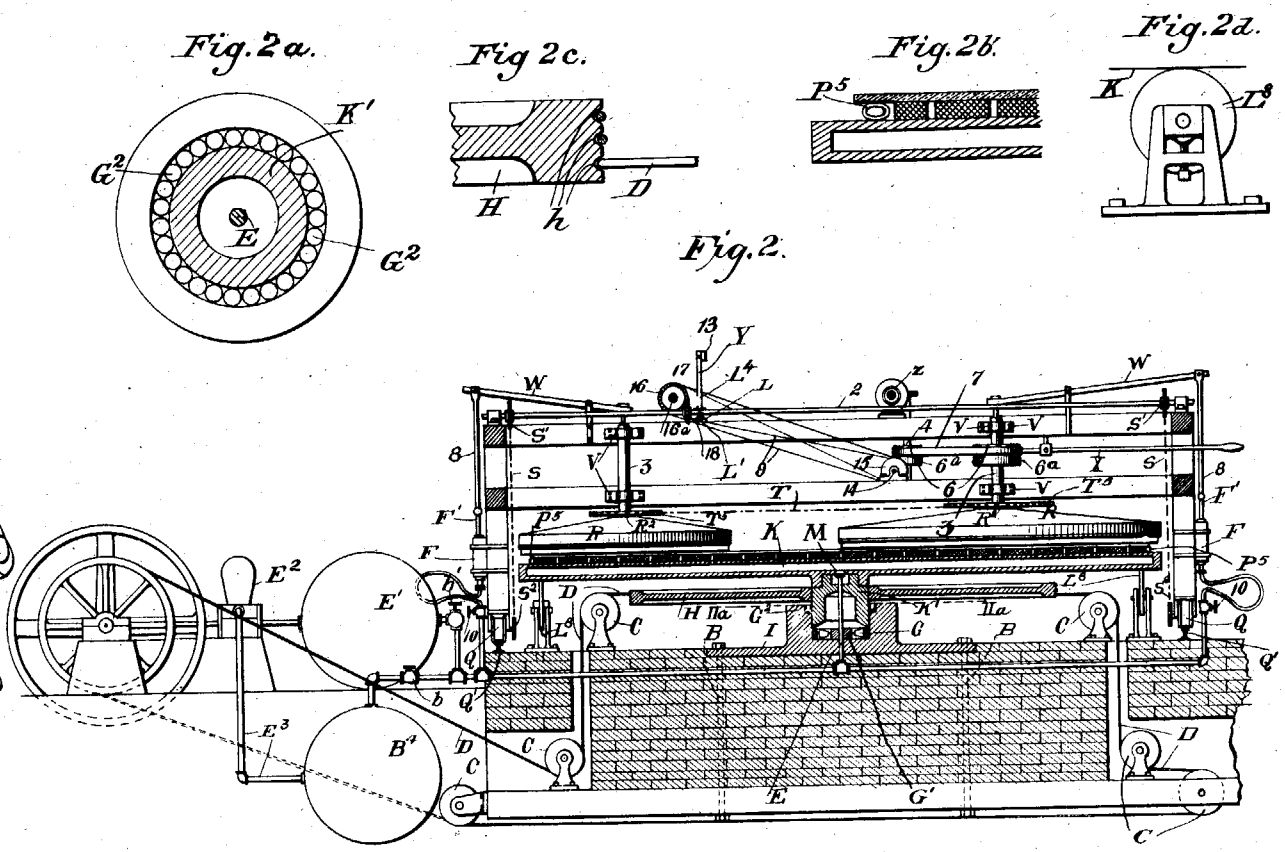
WITNESSES:
E. R. Rodd.
Chas. S. Lipley
Edward Bagnall INVENTOR.
By C. M. Clarke his ATTORNEY.

No. 12,604. REISSUED FEB. 12, 1907.

E. BAGNALL.

APPARATUS FOR GRINDING, SMOOTHING, AND POLISHING PLATE GLASS.

APPLICATION FILED MAR. 30, 1905.

4 SHEETS—SHEET 3.

WITNESSES:

E. R. Rodd.

Chas. S. Lepley

Edward Bagnall INVENTOR.

BY O. M. Clarke his ATTORNEY.

No. 12,604. REISSUED FEB. 12, 1907.

E. BAGNALL.

APPARATUS FOR GRINDING, SMOOTHING, AND POLISHING PLATE GLASS.

APPLICATION FILED MAR. 30, 1905.

4 SHEETS—SHEET 4.

WITNESSES:

E. R. Rodd.

Chas. S. Lipley.

Edward Bagnall INVENTOR.

BY C. M. Clark his ATTORNEY.

UNITED STATES PATENT OFFICE.

EDWARD BAGNALL, OF PITTSBURG, PENNSYLVANIA, ASSIGNOR, BY DIRECT AND MESNE ASSIGNMENTS, TO ZOFFER PLATE GLASS MANUFACTURING COMPANY, OF CHARLEROI, PENNSYLVANIA.

APPARATUS FOR GRINDING, SMOOTHING, AND POLISHING PLATE-GLASS.

No. 12,604. Specification of Reissued Letters Patent. Reissued Feb. 12, 1907.

Original No. 716,981, dated December 30, 1902. Application for reissue filed March 30, 1905. Serial No. 252,991.

*To all whom it may concern:*

Be it known that I, EDWARD BAGNALL, of Pittsburg, in the county of Allegheny and State of Pennsylvania, have invented certain new and useful Improvements in Apparatus for Grinding, Smoothing, and Polishing Plate-Glass; and I do hereby declare the following to be a full, clear, and exact description of the invention, such as will enable others skilled in the art to which it appertains to make and use the same.

My invention relates to an improvement in apparatus for grinding, smoothing, and polishing plate-glass, the object of same being to provide effective and economical means which can be brought into action to successively smooth and polish the glass surface, thus completing one surface of the plate before the latter is turned for treatment on its opposite face.

A further object is to provide successful means for creating and maintaining a vacuum within the table, whereby the plates are retained in place by atmospheric pressure on the outside.

A further object is to provide the table with a non-porous facing or cushion which will yield or give to inequalities in the surface of the glass plates.

A further object is to generally improve the construction and operation of glass grinding and polishing machinery in the manner hereinafter more fully described and claimed.

With these objects in view my invention consists in the parts and combinations of parts and in the details of construction, as will be more fully described, and pointed out in the claims.

Figure 4:
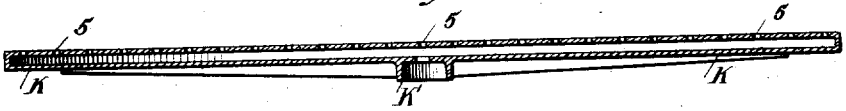
Figure 5:
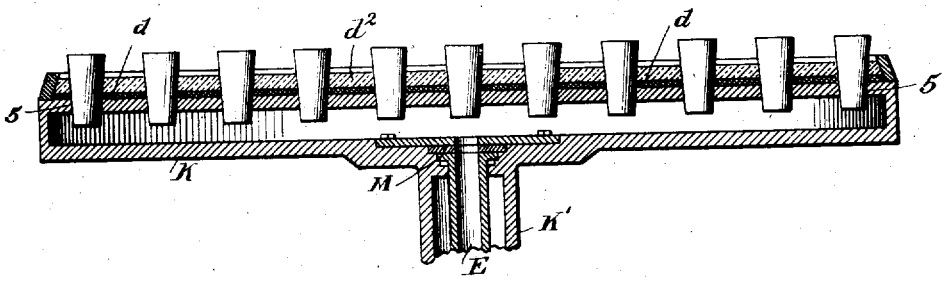
Figure 6:
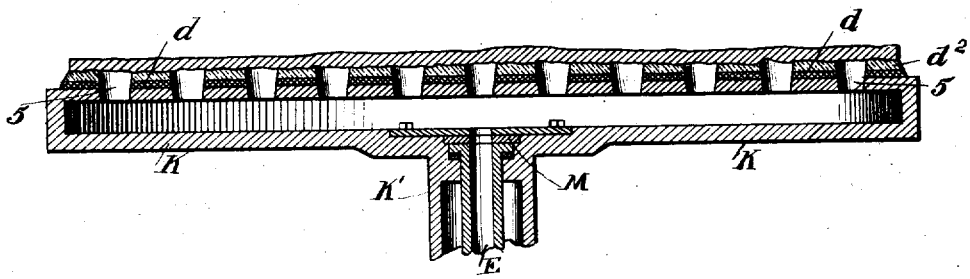
Figure 7:
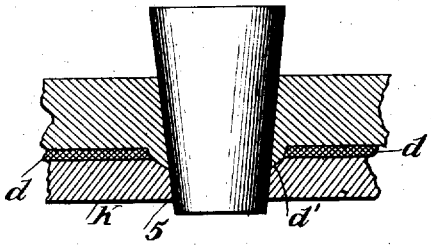
Figure 8:
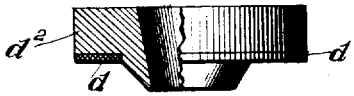

In the accompanying drawings, Figure 1 is a view in plan of an apparatus embodying my invention. Fig. $1^a$ is a detail sectional view, on an enlarged scale, partly broken away, showing the belt transmission and arrangement of the tight and loose pulleys. Fig. 2 is a view in vertical section showing the engine, pump, and tanks in elevation. Fig. $2^a$ is an enlarged cross-sectional view on the line $II^a$ $II^a$ of Fig. 2. Fig. $2^b$ is an enlarged sectional detail view showing a portion of the rotating table and the surrounding pneumatic cushion with a portion of the perforated blanket and of the glass plate. Fig. $2^c$ is an enlarged sectional detail view showing the rim of the driving-pulley provided with the lined grooves. Fig. $2^d$ is a detail view, in side elevation, of one of the resiliently-supported adjustable carrying-wheels for the rotating table. Fig. 3 is a detail view showing one of the runners R and adjacent parts. Fig. $3^a$ is an enlarged cross-sectional view indicated by the line $III^a$ $III^a$ of Fig. 3. Fig. 4 is a view in section of the table. Fig. 5 is a view in section of the table, showing the method of forming the cushion. Fig. 6 is a view in section of the table, showing a plate of glass thereon. Fig. 7 is a view in section of the table, showing a modification of the cushion. Fig. 8 is a modified form of cushion.

K represents the hollow table on which the glass plates to be ground and polished are placed. This table is secured centrally to the vertical hollow shaft K′, which latter is mounted in the bed-plate I, secured to and resting on a solid masonry or other foundation, the said bed-plate being held solidly in place by the bolts B. The bed-plate I is provided with an upwardly-extending central enlargement hollowed out to receive the shaft K′, which latter is sustained by antifriction-rollers G, carried in a frame G′, resting on the floor of the recess in the base, and laterally by the antifriction-rollers $G^2$, supported in vertical positions near the upper end of the enlargement. The shaft K′ is hollowed out, as shown, and is open at its lower end and, together with the hollow enlargement of the base, forms an oil-chamber, which operates to keep the shaft K′ and its bearing well lubricated. The table K is, as before stated, made hollow, and its top is provided with a series of perforations communicating with the interior, so that when the air is exhausted from within the table the pressure against the plate or plates resting on the table caused by the partial vacuum within the table operates to hold the latter in place during the operations of grinding and polishing. Passing up through the hollow shaft K′ and connected with the table by a suitable coupling M is a branch of the air-exhaust pipe E, the upper end of said branch pipe being in open communication with the table, as shown, so that when the air is exhausted from the pipe E it will also be exhausted from the table. The exhaust-pipe E leads to the vacuum-tank E′, from which the air is exhausted by means of the air-pump $E^2$. A branch pipe $E^3$ connects with the tank $B^4$, which contains compressed air, which is forced into it from the air-pump, and communication between the hollow table and these tanks is established by the valves *b* and *b′*. Secured on shaft K′, between the table and the shaft-bearing, is the large pulley H, around which the driving rope, chain, cable, or equivalent power-transmitting device D winds. The grooves in this pulley may be lined with leather or rubber *h* or be provided with pockets having rubber blocks therein for preventing the rope or cable from slipping thereon, and the pulley may, if desired, be made of wood and be rotated by the ordinary hemp or manila rope. This power-transmitting device D on its way to and from pulley H passes over and under guiding-pulleys C, which latter are so located as to sustain the cable or its equivalent in proper operative position. This cable is preferably arranged in a gutter or conduit below the floor-level of the factory, so as not to obstruct the floor-space thereof, and the drum around which it winds may be actuated by the same engine which operates the air-pump. The table thus mounted and supported is rotated by the rope or cable D and carries on its upper face the plate or plates of glass to be treated. These plates of glass in their original condition are rough and uneven. The first operation is to grind off the uneven surfaces, after which the ground surfaces are polished, and I propose in my apparatus to both grind the plate and then polish the surface thus ground before turning the plate over or removing it. The difficulty heretofore experienced in this class of machines has been to secure an air-tight sealing contact between the plate and the table, due to the non-resilient character of each, although I am aware that it has been proposed to employ sheets of pulp for packing and compensating for variations in thickness of the glass and also to use fluid to overcome the difficulty, as in patents of Marsh, 477,303 and 477,304. The finished side of the glass will make sufficiently close contact with the surface of the table to preserve the vacuum without the interposition of a cushion or packing of any kind but with the rough side a pliable cushion is necessary. The cushion I employ is composed of a composition $d^2$ of glue, molasses, and Spanish white in proper proportions and is cast on the table within a removable ring secured to the table for the purpose and allowed to cool or solidify thereon, the holes in the table being closed by suitable pegs, which project up sufficiently far to form corresponding holes in the cushion. After the cushion has cooled off the pegs and ring are removed, and the composition is ready to receive the plate or plates. After one side of the glass has been ground smooth the cushion or packing may be removed, as the smooth face of the plate makes an air-tight contact with the table, and to facilitate this removal and handling of the cushion I prefer to provide the same with a canvas backing *d*. This backing is applied to the cushion by first placing over it the whole or part of the table with the openings therein alining with the holes in the table, or if the canvas be a new piece without holes the holes should be formed to aline with the holes 5 in the table. The composition in a melted state should then be poured onto the canvas and permitted to cool or harden thereon, the holes in the canvas and table being of course first plugged to prevent the composition from entering the cavity in the table and also to insure the formation of corresponding holes in the cushion. In order to insure perfect and complete alinement between the holes in the cushion and those in the table, I may countersink the latter, as shown at *d′*, Fig. 7, which will produce a corresponding projection on the lower face of the cushion, which projections form guides for directing the replacement of the cushion on the table. When it is necessary to place several plates of varying thicknesses on the table at one time, I prefer instead of making the cushion of one piece or in blanket form to make it up in the form of rings, each forming a separate cushion around each opening in the table. By making these rings of different thicknesses and having an assortment of them the proper rings can be selected to just bring the surfaces of the several plates to the proper and common level. These rings are shown in Fig. 8, and while I prefer to make them of the composition above described they may be made of rubber and are preferably provided with a depending projection, as shown, to hold them in proper position over their respective openings. To assist in preventing the entrance of air to the table, I may surround each blanket with a pneumatic cushion $P^5$ of approximately the thickness of the blanket. This pneumatic tube or cushion is designed to support the glass plate near the edges of the latter, and thus prevent the entrance of any air due to inequalities in the surface of the glass. It should also be understood that when the glass plate or plates on the table do not cover all the holes therein the exposed holes therein must, in order to secure and maintain the necessary partial vacuum, be plugged up.

The traveling frame that I have shown in the drawings is equipped for grinding the glass to a level surface. In addition I employ a traveling frame for polishing; but the latter is identical with that here shown, except that polishing-rubbers are used in place of grinding-rubbers. The two traveling frames thus equipped are mounted on flanged wheels Q, which latter run on rails Q′, secured to the floor, and are adapted to travel over the table or series of tables arranged in line, the grinder being in advance of the polisher. The frame of the traveling carriage may be of any approved design, constructed to span the table and freely pass over same and necessarily of strength amply sufficient to carry the operating parts. Generally speaking, it comprises sides having flanged track-wheels, which run on the rails, and connecting-beams, which carry the operating parts.

Mounted in journal-boxes V are the hollow shafts 3. These bearings preferably carry antifriction-rollers, or rollers which hold the upright hollow shafts in position and reduce the friction. Each shaft 3 carries at its lower end a sprocket-wheel $T^5$, and mounted in the hollow shafts, so as to rotate therewith, but free to move vertically therein, are the inner shafts $R^2$, each of which passes through its hollow shaft 3 and is connected at its upper end by a suitable connection with the short arm of a lever W and carries at its lower end a runner R. These levers W are pivoted to the frame, and each is connected at its outer end by pitman 8 with the piston-rod F′ of the vacuum-motor F, carried on the frame. These motors F are simply cylinders carrying pistons and connected at their lower ends by flexible pipes with a branch pipe leading to vacuum-pipe E, each branch pipe having a valve 10 for opening and closing communication with the cylinders and vacuum-pipe. With this construction it will be seen that by opening valves 10 the suction or partial vacuum in pipe E will cause the pistons in cylinders F to descend, and thus elevate by the connections already described the runners R, so that the frame may be freely moved over the table without contact therewith. One runner-shaft 3 carries a tight pulley 6 and a loose pulley $6^a$, which are coupled up by a belt 7 with corresponding pulleys 6 and $6^a$ on the main driving-shaft 4. This driving-shaft is carried vertically on the frame, as shown, and is coupled up directly at its upper end to the electric motor Z, which latter may receive its current from an electric conductor in any of the well-known ways now in common use. The two hollow shafts 3 are each provided with a sprocket-wheel $T^5$, connected by sprocket-chain T, so that both shafts, with their rubbers, rotate in unison, and the motion imparted to said sprocket-wheels and the runners by the motor will be reverse to the direction of rotation of the table K. It is therefore apparent that one or both of the rubbers can be elevated or lowered while rotating or at rest, and as the rubbers are each secured to a shaft revolving with but free to move longitudinally in the hollow shafts a vertical movement of one or both of the rubbers does not affect the alinement of the sprocket-wheels by which they are coupled up, and by providing tight and loose pulleys and a shifter X for shifting the rubber's driving-belt the movements of the latter may always be under control without affecting the movements of the other parts also actuated by the motor Z. The driving-shaft 4 is also connected by means of suitable gearing and clutch mechanism with shaft 14, which carries two pulleys 15, each of which is connected by a belt 9, one of which is crossed to corresponding pulleys 16 on shaft 17. These shafts 17 and 14 also carry two loose pulleys, one of the latter being double the width of the belt and located between the two tight pulleys and the other on the outside of one of the fixed pulleys. The belts 9, which are mounted on these pulleys, are shifted by automatic shifting devices constructed as follows.

L represents a pair of standards carried by the frame of the machine and having flattened tops with upwardly-projecting pins.

L′ is a sliding bar resting on the flat faces of the standards and provided with slots for the passage of said upwardly-projecting pins, with a pair of belt-hooks $L^4$, which engage and move the belts when the sliding bar is shifted, and with an upwardly-projecting standard Y, the latter being adjustably secured to the bar, so that its position may be shifted when necessary.

13 represents an arm located in a plane above the table and in position to engage the standard Y′ and shift the latter longitudinally, thus carrying with it the sliding bar and the belt-hooks, which latter shift one belt from the tight pulley onto the loose pulley and the other belt from the loose pulley onto the tight pulley, thus reversing the direction of rotation of the shaft 17. This shaft 17 is geared up by bevel-pinions $16^a$ and 18 to shafts 2, and the latter are connected by sprocket-wheels S′ $S^2$ and sprocket-chains S with the axles of two of the flanged wheels Q, one on each side, so that when shafts 2 are revolving the traveling frame carrying the rubbers is reciprocated or moved back and forth over the table, thus uniformly grinding or polishing the surface of the glass being treated. When it is desired to discontinue this movement of the frame carrying the rubbers, it can be accomplished by a clutch on shaft 17 or by throwing both belts onto the loose pulleys, which can be done with pulleys constructed and arranged as above described. The shifting arm 13 is hinged or arranged to be thrown up out of the way of standard Y. Hence when it is desired to move the frame carrying the rubbers from one table to another the arm 13, which would interfere with such movement, is thrown up out of the way and the frame permitted to continue its movement to the next table. It will of course be understood that the crossed belt 9 imparts motion in one direction to shaft 17, while the straight belt rotates the latter in the opposite direction. Hence when one of these belts is on the tight pulley the other must be on the loose pulley, and when both are on the loose pulley shaft 17 will remain idle.

The rubbers R are shown of different sizes and are preferably so arranged that the larger one overlaps the center of the table, while the smaller one overlaps the outer edge, thus insuring a positive engagement of the rubbers with the entire exposed surfaces of the plates on the tables, and as the table is rotated in one direction and the rubbers in the opposite direction and at a greater rate of speed it will be readily seen that the grinding and polishing will be accomplished not only in a rapid but effective manner.

The table being mounted centrally is liable to tilt or yield slightly, and to prevent this and to add additional stability to the same I support the table near its periphery on a series of rollers $L^8$, located equidistant apart. These rollers $L^8$ are mounted in bearings and are preferably supported on springs carried on screws, whereby they can be adjusted to firmly bear against the under side of the table with a yielding pressure, and thus absolutely prevent any wabbling of the table.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. In a glass grinding and polishing machine, the combination with a bed provided with a hollow enlargement, of a table, a central shaft depending from the table extending into said hollow enlargement on the bed, antifriction-rollers in the bottom of said hollow enlargement under the lower end of the shaft to sustain the vertical thrust thereof, and an annular series of antifriction-rollers mounted in the vertical wall of said enlargement to sustain the lateral thrust of said shaft.

2. A glass polishing and grinding table on which the glass is retained in position by a vacuum under the glass, provided with a yielding detachable perforated cushion and the vacuum-chamber on which the glass plate rests, the said cushion being constructed and having the characteristics substantially as described.

3. A glass grinding and polishing table on which the glass is retained in position by a vacuum or suction, provided with a yielding detachable cushion composed of a back or base of any suitable fabric or textile and an upper surface of soft non-porous composition, said members of the cushion having alined holes communicating with the vacuum or suction chamber substantially as described.

4. The combination with a glass grinding and polishing table having a vacuum-chamber therein and a plurality of openings through its top, of a cushion for said table composed of a series of separate sections of varying thickness, each section comprising a soft non-porous composition, and having perforations alining with the openings through the top of the table, substantially as described.

5. The combination with a glass grinding and polishing table having a vacuum-chamber therein and an opening through its top, the said opening being countersunk, of a soft non-porous cushion on said table, said cushion having an opening corresponding with the opening in the table and also provided with a depending projection which rests within the countersunk portion of said opening, substantially as described.

6. The combination with a table having a central depending shaft and means connected with the latter for rotating it, of equalizing-rollers supporting the periphery of the table and yielding and adjustable bearings for said rollers.

7. In a glass grinding and polishing machine, the combination with a hollow table having a plurality of holes through its upper face, a series of soft porous cushions resting on the table, each cushion having a single aperture therein alining with a single aperture in the table.

8. The combination of a glass-holding rotating table, and grinding and polishing runners rotating in a direction opposite to the rotation of the table, with means for simultaneously imparting to said runners a laterally-reciprocating movement, substantially as set forth.

9. The combination with a track, a table located between the rails of said track, a frame mounted on and adapted to be moved on the track, glass grinding or polishing runners supported by the frame, means for rotating the runners, and means for automatically elevating the runners.

10. The combination with a glass-holding table, a track passing the table, a frame mounted on and moving on the track, and glass grinding or polishing runners supported by the frame, of means for rotating the runners and automatic devices for imparting a to-and-fro movement of the frame on its track, as and for the purpose specified.

11. The combination with a glass-holding table and a track passing the table, of a frame mounted to travel on the track and adapted to be moved thereon into operative position over the table, glass grinding or polishing runners supported by the traveling frame, a motor mounted on the traveling frame, and means for connecting the motor with the runners, all substantially as described and specified.

12. The combination with a glass-holding table and a track adjacent thereto, of a traveling frame having wheels mounted on said track, runners mounted in said frame over the table, a motor on the frame, and gearing connecting said motor with the wheels of the frame and with the runners for simultaneously rotating the latter and causing the frame to run on the track.

13. The combination with a glass-supporting table, of a frame mounted to travel over said table, runners mounted in said traveling frame, a motor on said frame, gearing connecting the motor with the runners for rotating them, gearing operated by said motor to propel said traveling frame, and means for automatically reversing the operation of said last-mentioned gearing at each end of the travel of said frame.

14. The combination with a glass-supporting table, and a frame mounted to travel over and independent of said table, of means for rotating the table, runners carried by the traveling frame over the table, a motor mounted on the frame, and gearing connecting said motor with the runners and operating to rotate them in a direction reverse to the direction of rotation of the glass-supporting table.

15. The combination with a glass-holding table and a track passing the table, of a frame mounted on the track and adapted to be moved thereon into position over the table, revoluble glass grinding or polishing runners carried by the frame, means for rotating the runners, a motor mounted on the frame and means connecting the motor and track wheels of the frame, substantially as described and specified.

16. In a glass grinding and polishing machine, the combination with a rotary table, a movable frame carrying runners and means for rotating the runners, of a vacuum-cylinder for each runner, a piston in each cylinder, and means connecting each runner with its respective piston whereby the runners may be moved vertically, substantially as set forth.

17. The combination with a rotary table, a frame carrying runners, and means for propelling the frame over the table, of automatic shifting devices for changing the direction of movement of said frame whereby it is caused to move backward and forward over the table, substantially as described.

18. In a glass grinding and polishing machine, the combination with a table on which the glass is retained in position by a vacuum under the glass, of a yielding detachable cushion on the table, and a pneumatic cushion or collar encircling the yielding cushion and adapted to support the glass plate near the edges of the latter.

19. The combination with a table provided with a supporting-cushion, of a surrounding pneumatic-cushion tube, substantially as set forth.

20. The combination with a table provided with a supporting-cushion, and means for exhausting the air from the surface recesses of the table, of a surrounding pneumatic-cushion tube, substantially as set forth.

In testimony whereof I affix my signature in the presence of two witnesses.

EDWARD BAGNALL

Witnesses:

CHAS. S. LEPLEY,

C. M. CLARKE.